United States Patent
Bartolo et al.

(10) Patent No.: US 6,338,156 B1
(45) Date of Patent: Jan. 8, 2002

(54) METHOD AND DEVICE FOR DETECTING THE LOSS-OF-SIGNAL CONDITION AT THE INPUT OF A TRANSMISSION LINE INTERFACE

(75) Inventors: Gabriele Bartolo, Merate; Marzio Gerosa, Seregno; Daniela Giacomuzzi, Paderno d'Adda, all of (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/217,829

(22) Filed: Dec. 22, 1998

(30) Foreign Application Priority Data

Dec. 23, 1997 (IT) .......................... MI97A2849

(51) Int. Cl.⁷ .................. G06F 11/00; H03M 13/00
(52) U.S. Cl. .................. 714/812; 714/49; 370/217; 370/506; 375/293
(58) Field of Search .................. 714/728, 47, 49, 714/755, 775, 787, 812, 799, 817, 818–821, 822; 370/232, 252, 375, 428, 535, 463, 522, 335, 465; 709/224; 710/18; 375/347, 334, 259, 344

(56) References Cited

U.S. PATENT DOCUMENTS

| | | | |
|---|---|---|---|
| 4,302,839 A | * 11/1981 | Mueller | 370/506 |
| 4,774,703 A | * 9/1988 | Force et al. | 370/217 |
| 5,673,132 A | 9/1997 | Carbone, Jr. et al. | 359/177 |
| 5,781,587 A | * 7/1998 | Bruce | 375/293 |
| 5,923,653 A | * 7/1999 | Denton | 370/375 |
| 6,151,689 A | * 11/2000 | Garcia et al. | 714/49 |
| 6,215,778 B1 | * 4/2001 | Lomp et al. | 370/335 |

FOREIGN PATENT DOCUMENTS

EP 671 827 9/1995 ............. H04J/3/14

OTHER PUBLICATIONS

ITU–T Recommendation G.775; Nov. 1994.*
Jain (Error characteristics of fiber distributed data interface (FDDI); IEEE, Aug. 1990.).*
CCITT Recommendation G.703, Annex A "Physical/Electrical Characteristics of Hierarchical Digital Interfaces"pp 38–40.
ITU–T Recommendation G.775, "Loss of Signal (LOS) and Alarm Indication Signal (AIS) Defect Detection and Clearance Criteria" pp i–ii, and 1–6.

* cited by examiner

*Primary Examiner*—Albert Decady
*Assistant Examiner*—Guy Lamarre
(74) *Attorney, Agent, or Firm*—Sughrue, Mion, Zinn, Macpeak & Seas, PLLC

(57) ABSTRACT

A method of detecting the loss-of-signal condition at the input of a transmission line interface when the input signal is coded. The input signal decoding includes an additional procedure allowing the detection of loss-of-signal condition. Since the pseudo-random sequence of the input signal transitions includes sequences of code violations, the additional procedure, over a certain threshold error rate, corresponding to a number of code violations in a unit of time, detects the loss-of-signal condition.

6 Claims, 1 Drawing Sheet

METHOD AND DEVICE FOR DETECTING THE LOSS-OF-SIGNAL CONDITION AT THE INPUT OF A TRANSMISSION LINE INTERFACE

BACKGROUND OF THE INVENTION

(1) Field of the Invention

The present invention relates to a method and device for detecting the loss-of-signal condition at the input of a transmission line interface, said input signal being a coded one and comprising pseudo-random sequences of signal transitions.

(2) Description of the Prior Art

In on-line transmission systems, the hardware line interface unit (LIU) receiving signals from the lines (cable-type) can be too sensitive and can locally regenerate a signal even in the absence of useful signal transitions on the line, especially when the signal on the line becomes too low, under a given threshold, or in the absence of signal because of, e.g., a break of the cable, since the high input sensitivity leads to an erroneous interpretation of the line and apparatus noise levels as useful signal, thus regenerating the input signal as a sequence of pseudo-random transitions.

Under these conditions, the detection of loss of input digital signal (LOS), which is normally present, becomes unreliable and LIU regenerates an erroneous signal mixed with noise.

In order to overcome this problem, various hardware arrangements, based on an input circuit which detects the signal level followed by a signal muting stage, are already known.

Normally, said additional circuit is bulky, expensive and further requires to redesign and replace the entire input printed circuit board (PCB) containing the line interface LIU for all the apparatuses already installed, should they be not provided with said function, and it was necessary to connect it afterwards.

Therefore, it is an object of the present invention to overcome the aforesaid drawbacks and provide a method and device for detecting the loss-of-signal LOS condition at the input of a transmission line interface.

SUMMARY OF THE INVENTION

The present invention provides a method and device for detecting the loss-of-signal LOS condition at the input of a transmission line interface consisting in a very simple additional procedure to be inserted, during the decoding step, into the line interface when the input signal is coded. In fact, the decoder itself can be used as a loss-of-signal condition detector, since the pseudo random sequence of input signal transitions includes code violation sequences. The additional procedure over a certain threshold error rate, corresponding to a number of code violations per unit of time, detects the loss-of-signal, LOS, condition.

The present invention provides said method and device for detecting the loss-of-signal (LOS) condition at the input of a transmission line interface as best described below and claimed in the following claims, which are an integral part of the present specification.

The method according to the invention has the basic advantage that it can be carried out by means of a software routine which can be easily inserted in all the already installed apparatuses having no hardware arrangements installed yet, instead of replacing the entire card. In fact it suffices to reprogram the program storage in any manner known per se.

Further objects and advantages of the present invention shall become clear from the following detailed description of an embodiment thereof and from the accompanying drawings which are attached merely by way of a non limiting example.

DETAILED DESCRIPTION OF THE PREFERRED EMBODIMENT

Figure 1:
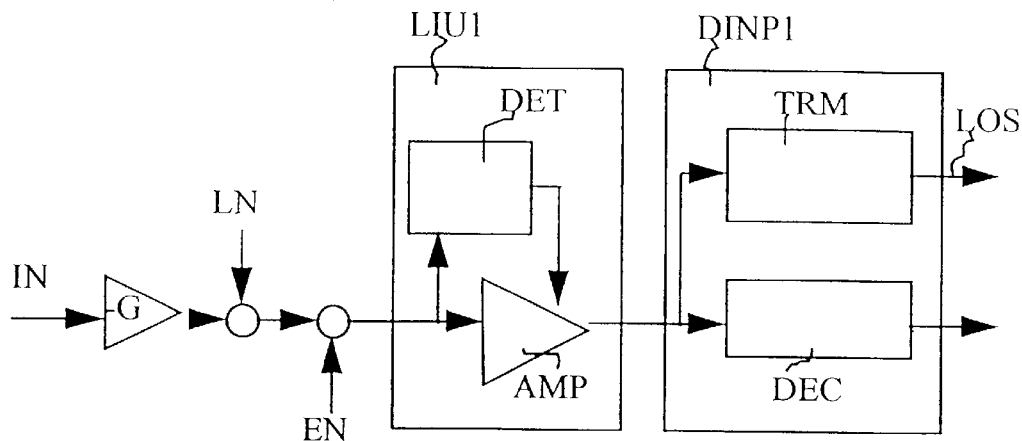
FIG. 1 shows a functional block diagram of a known circuit.

As an example of a known loss-of-signal detecting circuit, in FIG. 1 an input signal IN is supposed to have a determined attenuation level—G and to be summed with line noise LN and noise EN introduced by the apparatus.

Said signal IN is applied to an input line interface LIU1 of an apparatus, consisting of an input amplifier AMP which is normally used for regenerating the signal and taking it up to a level high enough to be applied to the following stages. When the input useful signal becomes too weak, the noise level at the input can be large enough to make AMP regenerate the signal mixed with noise at its output.

This gives rise to the problem that in the following digital input interface DINP1, the normally existing circuit TRM, which detects the LOS condition as an absence of transitions of the signal itself, is fooled because it detects transitions which are erroneously regenerated by AMP.

Therefore, an input level detecting circuit DET, for instance a peak-to-peak one, is inserted in the line interface LIU1 which, under a given threshold level, emits a muting signal of the AMP output signal.

DEC stands for a conventional decoding circuit of the input signal.

Figure 2:
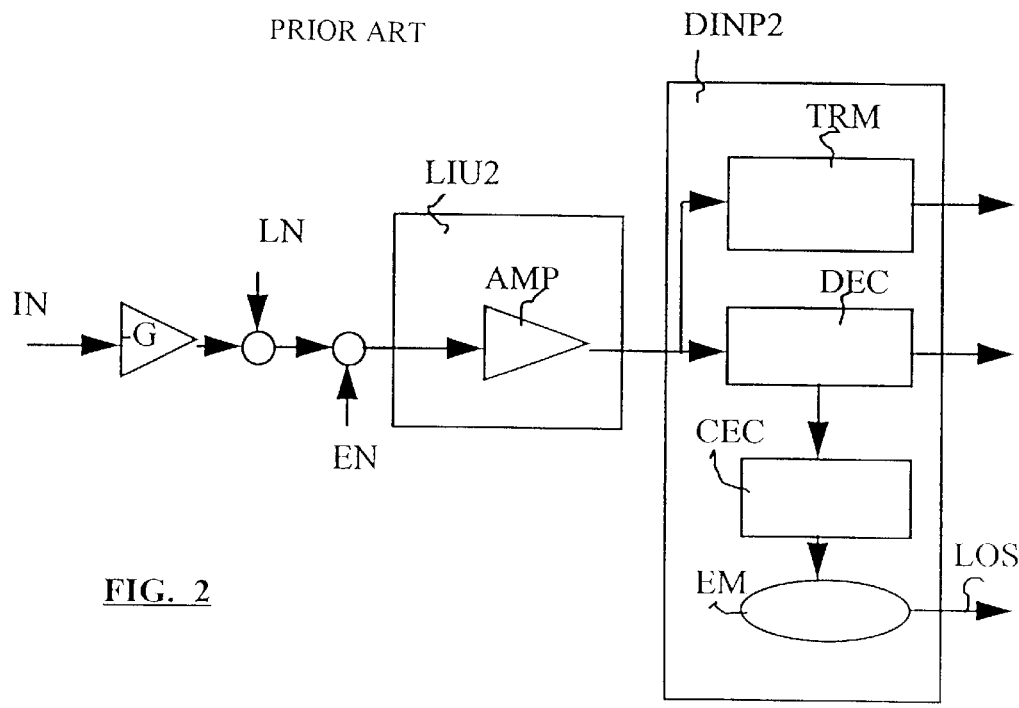
FIG. 2 shows a functional block diagram of the circuit according to the present invention.

Therefore, as depicted in FIG. 2, in accordance with the invention, a very simple method can be used for detecting the loss of input digital signal (LOS) when the input signal is coded, which replaces the operation of the detecting circuit DET.

Since the pseudo-random sequence of the input signal transitions includes code violation sequences, the decoder DINP2 can be used as a loss-of-signal condition detector, by carrying out a counting of the number of violations.

The decoder carries out an additional procedure whereby, over a certain threshold error rate corresponding to a number of code violations per unit of time, detects the loss-of-signal condition.

When the decoder includes an error detector, a code error counter CEC can be provided. Said counter can be already provided and forming part of the signal decoder.

Therefore, the EM procedure provides for counting the errors or reading out the counter when already provided, and for using the counting as a monitor of the attenuation level of signal coming from the line: under a certain attenuation level, equivalent to the overcoming of a given threshold value in terms of error rate and therefore of counting on the counter, it detects the loss-of-signal (LOS) condition.

The counter integrates a count over a given time interval and compares it with a threshold value in terms of number of errors (error rate).

As a non limiting example of a specific arrangement, a procedure has been developed in the case of a 2 Mb/s HDB3 coded input signal.

The HDB3 decoder includes an error code counter CEC used for signal decoding, which counts the violations of the zero sequence coding rule (see ITU-T Recommendation G. 703, Annex A).

This counter is read and cleared at each time interval by the aforesaid procedure EM.

In accordance with the ITU-T Recommendation G. 775, a LOS threshold, ranging between 18 and 22 dB, of input signal attenuation is used, with $2^{15}$ errors per second detected.

The foregoing is believed sufficient for those skilled in the art to understand the invention. Modifications and variations will be readily apparent in light of this disclosure. The actual scope, however, is defined by the following claims.

We claim:

1. A method of detecting a loss-of-signal condition of an input signal at an input of a transmission line interface, i.e., not in the transmission line itself, said input signal being a coded signal an d comprising pseudo-random sequences of signal transitions, wherein said method comprises, during a decoding step, the steps of evaluating a number of code violations of said pseudo-random sequences of signal transitions per unit of time, and declaring a loss-of-signal condition if said number of code violations exceeds a given threshold value, said method being free of any step of detecting a level of the input signal.

2. The method of detecting the loss-of-signal condition according to claim 1, wherein said decoding step comprises counting a number of decoding errors, said step of evaluating a number of code violations including said counting of the number of decoding errors.

3. The method according to claim 1, wherein said input signal is a 2Mbs HDB3 coded signal.

4. A device for detecting a loss-of-signal condition of an input signal at an input of a transmission line interface, i.e., not in the transmission line itself, said input signal being a coded signal and comprising pseudo-random sequences of signal transitions, wherein said device comprises means for evaluating a number of code violations of said pseudo-random sequences of signal transitions per unit of time, said means declaring a loss-of-signal condition if said number of code violations exceeds a given threshold value, said device being free of a means for detecting a level of the input signal.

5. The device for detecting the loss-of-signal condition according to claim 4, wherein said means for evaluating a number of code violations of said pseudo-random sequences comprises means for counting a number of decoding errors to produce a count, and processing means which integrates said count over a unit of time and which detects the loss-of-signal condition if the integrated count exceeds a given threshold value.

6. The device according to claim 4, wherein said input signal is a 2Mbs HDB3 coded signal.

* * * * *